United States Patent
Chern et al.

(10) Patent No.: US 9,800,849 B2
(45) Date of Patent: Oct. 24, 2017

(54) COMBINED OPTICAL LENS MODULE AND OPTICAL IMAGING DEVICE USING THE SAME

(71) Applicant: EVERREADY PRECISION IND. CORP., Kaohsiung (TW)

(72) Inventors: Jyh-Long Chern, Taipei (TW); Chih-Ming Yen, New Taipei (TW)

(73) Assignee: Everready Precision Ind. Corp., Kaohsiung (TW)

( * ) Notice: Subject to any disclaimer, the term of this patent is extended or adjusted under 35 U.S.C. 154(b) by 230 days.

(21) Appl. No.: 14/594,604

(22) Filed: Jan. 12, 2015

(65) Prior Publication Data
US 2016/0127701 A1 May 5, 2016

(30) Foreign Application Priority Data

Oct. 31, 2014 (TW) .............................. 103137847 A
Oct. 31, 2014 (TW) .............................. 103219357 U (51) Int. Cl.
| | |
|---|---|
| G03B 21/14 | (2006.01) |
| H04N 9/31 | (2006.01) |
| G02B 13/00 | (2006.01) |
| G02B 13/16 | (2006.01) |
| H04N 13/04 | (2006.01) |
| G06F 1/16 | (2006.01) |
| G06F 3/01 | (2006.01) |
| G06F 3/042 | (2006.01) |

(52) U.S. Cl.
CPC ......... *H04N 9/3173* (2013.01); *G02B 13/001* (2013.01); *G02B 13/008* (2013.01); *G02B 13/16* (2013.01); *G06F 1/1686* (2013.01); *G06F 3/017* (2013.01); *G06F 3/0425* (2013.01); *H04N 9/317* (2013.01); *H04N 9/3111* (2013.01); *H04N 13/0459* (2013.01); *G03B 21/142* (2013.01)

(58) Field of Classification Search
CPC ...... G03B 21/14; G03B 21/142; H04N 9/317; H04N 9/3147; G06F 3/01; G02B 13/008
USPC .... 353/100, 101, 102, 30, 94; 359/649, 650, 359/651, 353, 355, 356, 357
See application file for complete search history.

(56) References Cited

U.S. PATENT DOCUMENTS

| | | | |
|---|---|---|---|
| 6,309,072 B1 * | 10/2001 | Deter | H04N 9/12 348/750 |
| 2005/0099609 A1 * | 5/2005 | Masuzawa | G01C 3/10 353/101 |
| 2010/0103379 A1 * | 4/2010 | Fiess | H04M 1/0272 353/7 |
| 2013/0155378 A1 * | 6/2013 | Huang | G02B 27/26 353/8 |

* cited by examiner

*Primary Examiner* — Ryan Howard
(74) *Attorney, Agent, or Firm* — Muncy, Geissler, Olds & Lowe, P.C.

(57) ABSTRACT

A combined optical lens module and an optical imaging device with the combined optical lens module are provided. The optical imaging device includes a visible light-emitting unit, an invisible light-emitting unit, at least one visible light lens group and at least one invisible light lens group. After a visible light beam is transmitted through the at least one visible light lens group, a propagating direction of the visible light beam is changed. After an invisible light beam is transmitted through the at least one invisible light lens group, a propagating direction of the invisible light beam is changed.

12 Claims, 9 Drawing Sheets

COMBINED OPTICAL LENS MODULE AND OPTICAL IMAGING DEVICE USING THE SAME

FIELD OF THE INVENTION

The present invention relates to a combined optical lens module, and more particularly to a combined optical lens module for an optical imaging device.

BACKGROUND OF THE INVENTION

A projecting apparatus is widely used in our daily lives to project texts/pictures or image data onto a projection screen in order to facilitate the user to view the enlarged texts/pictures or image data in a visually comfortable manner. Recently, the general trends in designing electronic devices are toward small size, light weightiness and easy portability to meet the requirements of humanization. Correspondingly, the projecting system is developed toward miniaturization. As a consequence, the projecting system can be applied to electronic devices such as 3G mobile phones or personal digital assistants (PDAs). In addition, a small-sized projecting apparatus becomes a portable electronic device. On account of its portability, the user may use the small-sized projecting apparatus to watch movies everywhere they are, and thus the amusement purpose can be achieved without difficulty.

Figure 1:
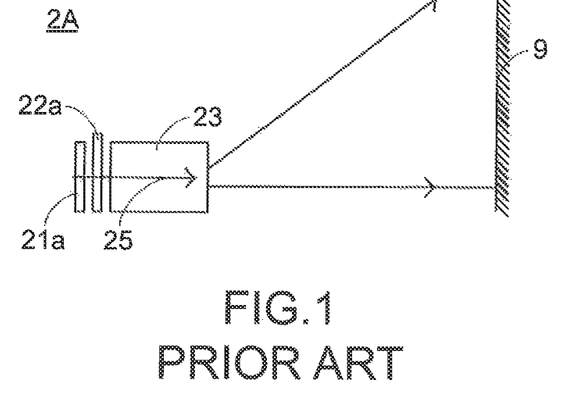
FIG. 1 is a schematic view illustrating a first conventional projecting apparatus.

FIG. 1 is a schematic view illustrating a first conventional projecting apparatus. As shown in FIG. 1, the projecting apparatus 2A comprises a light-emitting unit 21a, a display element 22a and an optical lens module 23. The display element 22a is arranged between the light-emitting unit 21a and the optical lens module 23. For example, the display element 22a is a transmissive LCD element. The light-emitting unit 21a provides a visible light beam 25 to the display element 22a. Moreover, the visible light beam 25 provided by the light-emitting unit 21a illuminates an image shown on the display element 22a. After the visible light beam 25 from the display element 22a is transmitted through the optical lens module 23 and then outputted, the image is projected on a projection surface 9.

Figure 2:
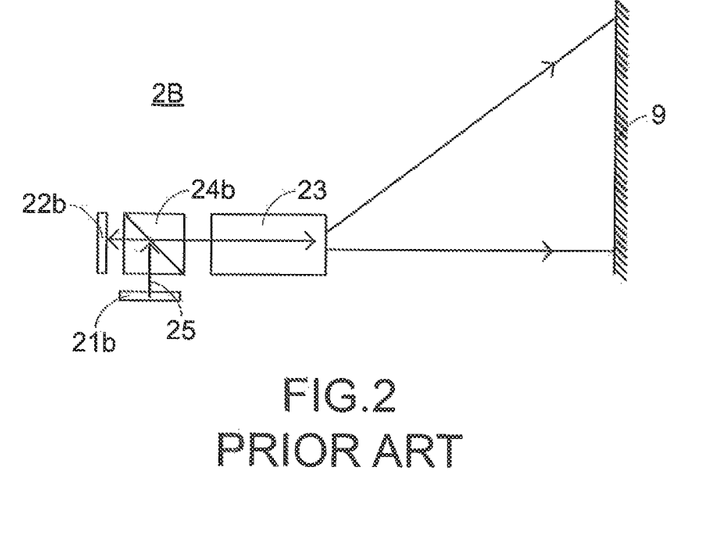
FIG. 2 is a schematic view illustrating a second conventional projecting apparatus.

FIG. 2 is a schematic view illustrating a second conventional projecting apparatus. As shown in FIG. 2, the projecting apparatus 2B comprises a light-emitting unit 21b, a polarization beam splitter (PBS) 24b, a display element 22b and an optical lens module 23. The polarization beam splitter 24b is arranged between the display element 22b, the light-emitting unit 21b and the optical lens module 23. For example, the display element 22b is a reflective LCOS (liquid crystal on silicon) element. The light-emitting unit 21b provides a visible light beam 25. After the visible light beam 25 is transmitted through the polarization beam splitter 24b, the visible light beam 25 is directed to the display element 22b. Moreover, the visible light beam 25 provided by the light-emitting unit 21a illuminates an image shown on the display element 22b. After the visible light beam 25 from the display element 22b is sequentially transmitted through the polarization beam splitter 24b and the optical lens module 23 and then outputted, the image is projected on a projection surface 9.

Figure 3:
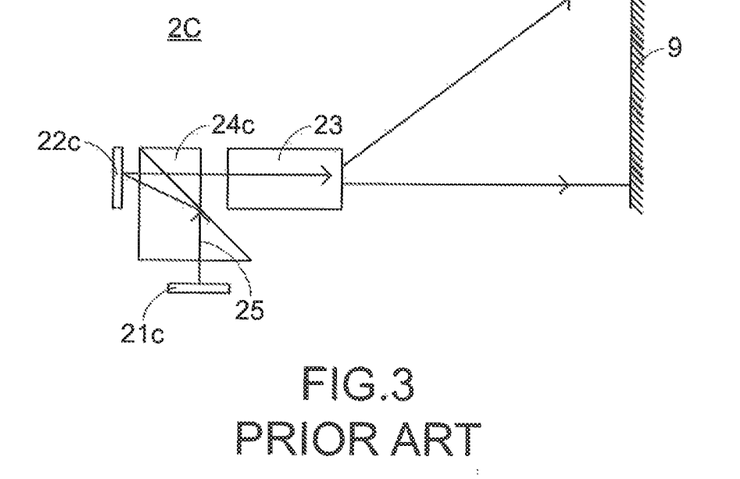
FIG. 3 is a schematic view illustrating a third conventional projecting apparatus.

FIG. 3 is a schematic view illustrating a third conventional projecting apparatus. As shown in FIG. 3, the projecting apparatus 2C comprises a light-emitting unit 21c, a total internal reflection (TIR) prism 24c, a display element 22c and an optical lens module 23. The total internal reflection prism 24c is arranged between the display element 22c, the light-emitting unit 21c and the optical lens module 23. For example, the display element 22c is a digital micromirror device (DMD). The light-emitting unit 21c provides a visible light beam 25. After the visible light beam 25 is transmitted through the total internal reflection prism 24c, the visible light beam 25 is directed to the display element 22c. Moreover, the visible light beam 25 provided by the light-emitting unit 21c illuminates an image shown on the display element 22c. After the visible light beam 25 from the display element 22c is sequentially transmitted through the total internal reflection prism 24c and the optical lens module 23 and then outputted, the image is projected on a projection surface 9.

Figure 4:
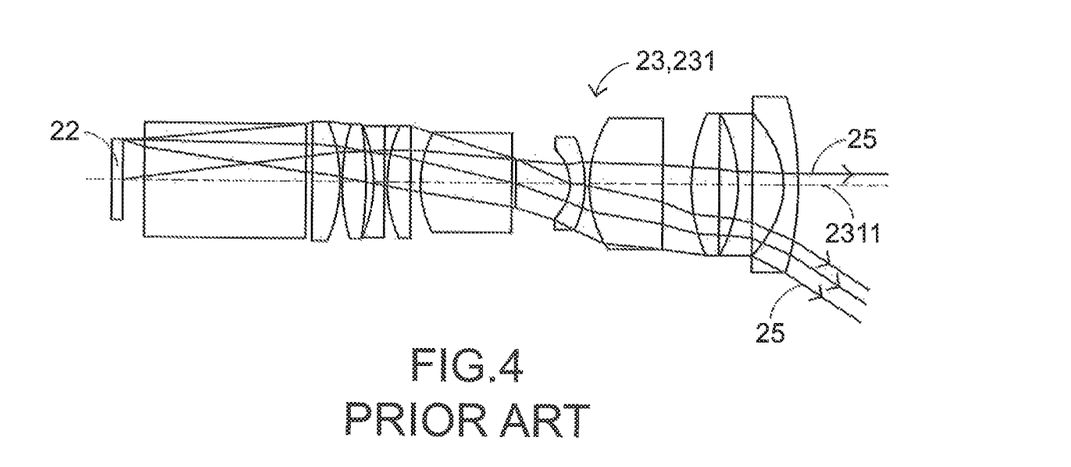
FIG. 4 is a schematic view illustrating the optical lens module of the conventional projection apparatus.

FIG. 4 is a schematic view illustrating the optical lens module of the conventional projection apparatus. The optical lens module 23 may be applied to the projection apparatuses of FIGS. 1-3. As shown in FIG. 4, the optical lens module 23 comprises an optical lens group 231. The optical lens group 231 comprises plural optical lenses, which are sequentially arranged along an optical axis 2311 in the direction from an object side to an image side. By the optical lens group 231, the travelling direction of the visible light beam 25 from the display element 22 is changed. Consequently, the image shown on the display element 22 is enlarged and projected in a specified direction.

Moreover, as the demands on the quality of life are gradually increased, the people's appeals for image development are changed from the conventional 2D planar image and 3D planar image to the current 3D stereoscopic image. The appeal lies in the reality of watching the image. Consequently, the viewer feels that he (or she) is personally on the scene while watching the image. However, since the conventional projection apparatus is equipped with a single optical lens group, it is difficult to project out the realistic 3D stereoscopic image. In other words, it is difficult to use the conventional projection apparatus to achieve the 3D autostereoscopic efficacy.

As the entertainment and convenience needs are gradually increased, more users desire to interact with the image which is projected out by the projection apparatus. For meeting these needs, the manufacturers have to install an additional device at the outside of the conventional projection apparatus. For example, the additional device is a sensing device for sensing the human's behaviors in order to comply with the users' requirements. The additional device may increase the volume of the overall system. In other words, the arrangement of the additional device is detrimental to the miniaturization of the projection apparatus.

As mentioned above, the conventional projection apparatus and the optical lens module thereof need to be further improved.

SUMMARY OF THE INVENTION

An object of the present invention provides a combined optical lens module comprising plural optical lens groups for focusing plural visible light beams and plural invisible light beams on one or more focal planes. Moreover, plural lenses corresponding to different optical lens groups are integrally formed and connected with each other. Consequently, the combined optical lens module can be assembled more easily. Since the combined optical lens module has the advantage of miniaturization, the combined optical lens module can be applied to a handheld mobile device or a wearable device.

Another object of the present invention provides an optical imaging device with the combined optical lens module for projecting out a 3D stereoscopic image. The 3D stereoscopic image may be used in a human-machine interaction environment for sensing the actions of a human body. Consequently, the 3D stereoscopic image can be interacted with the user more effectively.

In accordance with an aspect of the present invention, there is provided a combined optical lens module. The combined optical lens module includes plural optical lens groups and a housing. The plural optical lens groups includes at least one visible light lens group and at least one invisible light lens group. After at least one visible light beam is transmitted through the at least one visible light lens group, a propagating direction of the at least one visible light beam is changed. After at least one invisible light beam is transmitted through the at least one invisible light lens group, a propagating direction of the at least one invisible light beam is changed. The housing is used for accommodating the plural optical lens groups.

In an embodiment, one of the plural optical lens groups is a center optical lens group, and the other optical lens groups of the plural optical lens groups are peripheral optical lens groups around the center optical lens group.

In an embodiment, the center optical lens group is one of the at least one visible light lens group or one of the at least one invisible light lens group.

In an embodiment, an included angle is formed between a center optical axis of the center optical lens group and a peripheral optical axis of each of the plural peripheral optical lens groups.

In an embodiment, the included angle is determined according to a position of a viewer or the included angle is smaller than 20 degrees.

In an embodiment, the plural optical lens groups include a first optical lens group with a first lens and a second optical lens group with a second lens, wherein the first lens and the second lens are integrally formed and connected with each other.

In an embodiment, an image shown on a display element is illuminated by the at least one visible light beam, and the image is projected out after the at least one visible light beam is transmitted through the at least one visible light lens group. Alternatively, each of the at least one invisible light lens group includes a lens, and the at least one invisible light beam is introduced into the lens through a first surface of the lens and outputted from a second surface of the lens. Alternatively, the at least one invisible light beam includes at least one of an ultraviolet light beam, an infrared light beam, a near infrared light beam and a far infrared light beam; and/or the combined optical lens module is included in a wearable mobile device or a wearable device.

In accordance with another aspect of the present invention, there is provided an optical imaging device with a combined optical lens module. The optical imaging device includes at least one visible light-emitting unit and plural optical lens groups. The at least one visible light-emitting unit provides plural visible light beams. The plural optical lens groups include at least one visible light lens group and at least one invisible light lens group. After at least one portion of the plural visible light beams is transmitted through the at least one visible light lens group, a propagating direction of the at least one portion of the plural visible light beams is changed. After at least one portion of the plural invisible light beams is transmitted through the at least one invisible light lens group, a propagating direction of the at least one portion of the plural invisible light beams is changed.

In an embodiment, the optical imaging device is an optical projection apparatus, and the optical projection apparatus includes at least one display element. At least one image shown on the at least one display element is illuminated by the at least one portion of the plural visible light beams. Moreover, the at least one image is projected out after the at least one portion of the plural visible light beams is transmitted through the corresponding visible light lens group.

In an embodiment, the at least one display element is a single display element and the at least one image at least includes a first image and a second image, or the at least one display element includes a first display element showing the first image and a second display element showing the second image. The at least one visible light lens group at least includes a first visible light lens group corresponding to the first image and a second visible light lens group corresponding to the second image. The first image is transmitted through the first visible light lens group and projected on a first projection block. The second image is transmitted through the second visible light lens group and projected on a second projection block.

In an embodiment, the first projection block and the second projection block are coplanar or non-coplanar. Alternatively, the first projection block and the second projection block are at least partially overlapped or not overlapped. Alternatively, the first image and the second image are simultaneously projected out or successively projected out.

In an embodiment, one of the plural optical lens groups is a center optical lens group, and the other optical lens groups of the plural optical lens groups are peripheral optical lens groups around the center optical lens group.

In an embodiment, the center optical lens group is one of the at least one visible light lens group or one of the at least one invisible light lens group. Alternatively, an included angle is formed between a center optical axis of the center optical lens group and a peripheral optical axis of each of the plural peripheral optical lens groups.

In an embodiment, the optical imaging device further includes a housing accommodating the plural optical lens groups. Alternatively, the at least one invisible light beam includes at least one of an ultraviolet light beam, an infrared light beam, a near infrared light beam and a far infrared light beam. Alternatively, the plural optical lens groups include a first optical lens group with a first lens and a second optical lens group with a second lens, wherein the first lens and the second lens are integrally formed and connected with each other.

In accordance with a further aspect of the present invention, there is provided an optical imaging device with a combined optical lens module. The optical imaging device includes at least one display element and plural optical lens groups. The at least one display element includes at least one visible light-emitting unit. The at least one visible light-emitting unit provides plural visible light beams. Moreover, a first image and a second image shown on the at least one display element are illuminated by the plural visible light beam. The plural optical lens groups include a first visible light lens group corresponding to the first image and a second invisible light lens group corresponding to the second image. The first image is projected on a first projection block through the first visible light lens group. The second image is projected on a second projection block through the second visible light lens group. The first projection block and the second projection block are not completely overlapped with each other.

In an embodiment, the first projection block and the second projection block are coplanar, or the first projection block and the second projection block are non-coplanar.

In an embodiment, the at least one display element is a single display element and the first image and the second image are shown on the single display element. Alternatively, the at least one display element includes a first display element showing the first image and a second display element showing the second image.

In an embodiment, the plural optical lens groups further include at least one invisible optical lens group, and after at least one invisible light beam is transmitted through the at least one invisible light lens group, a propagating direction of the at least one invisible light beam is changed. Alternatively, one of the plural optical lens groups is a center optical lens group, and the other optical lens groups of the plural optical lens groups are peripheral optical lens groups around the center optical lens group. Alternatively, the plural optical lens groups include a first optical lens group with a first lens and a second optical lens group with a second lens, wherein the first lens and the second lens are connected with each other.

In an embodiment, the first image and the second image are simultaneously projected out or successively projected out.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 5:
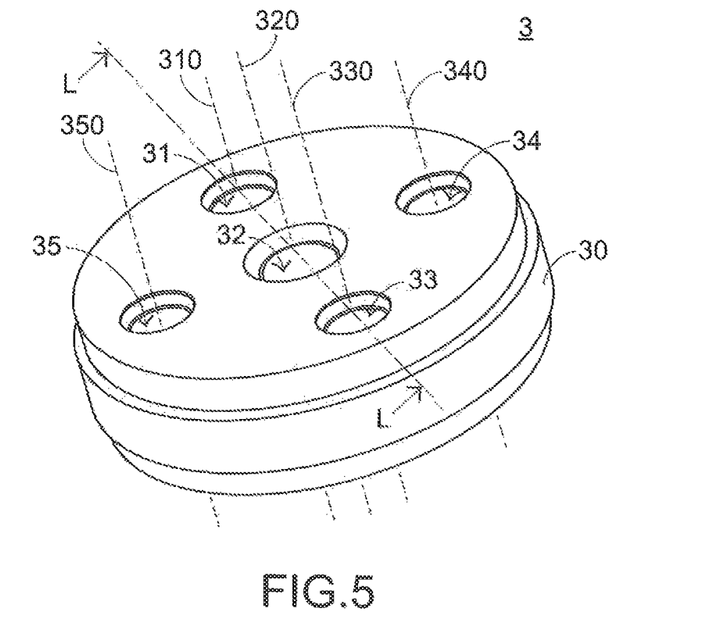
FIG. 5 is a schematic perspective view illustrating the outer appearance of a combined optical lens module according to an embodiment of the present invention.
Figure 6:
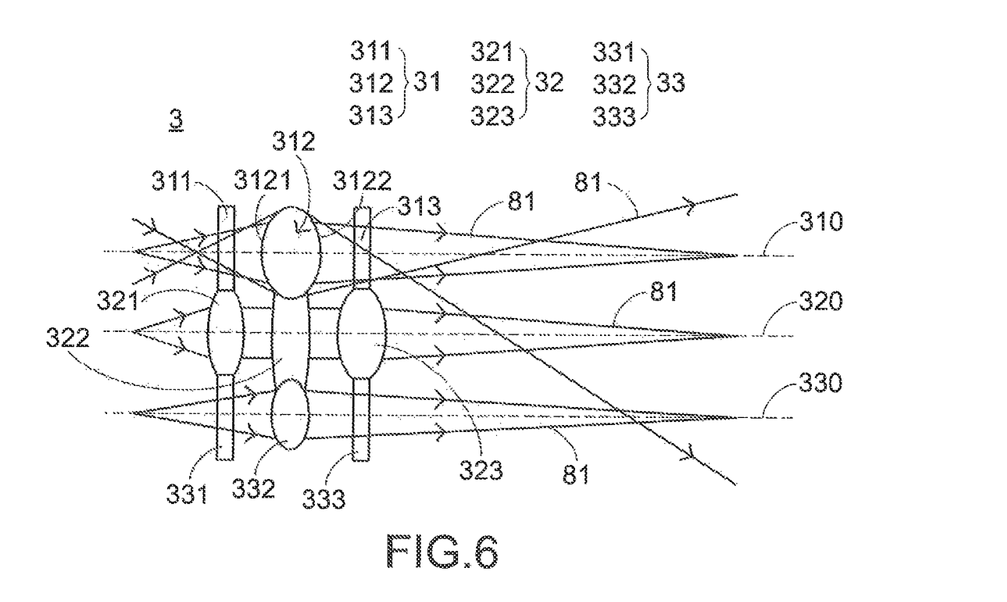
FIG. 6 is a schematic cross-sectional view illustrating the combined optical lens module of FIG. 5 and taken along the line L.

FIG. 5 is a schematic perspective view illustrating the outer appearance of a combined optical lens module according to an embodiment of the present invention. FIG. 6 is a schematic cross-sectional view illustrating the combined optical lens module of FIG. 5 and taken along the line L. Please refer to FIGS. 5 and 6. The combined optical lens module 3 comprises a first optical lens group 31, a second optical lens group 32, a third optical lens group 33, a fourth optical lens group 34, a fifth optical lens group 35 and a housing 30. The housing 30 is used for accommodating and fixing these optical lens groups 31~35. The first optical lens group 31 comprises a first lens 311, a fourth lens 312 and a seventh lens 313, which are sequentially arranged along the direction of an optical axis 310. The second optical lens group 32 comprises a second lens 321, a fifth lens 322 and an eighth lens 323, which are sequentially arranged along the direction of an optical axis 320. The third optical lens group 33 comprises a third lens 331, a sixth lens 332 and a ninth lens 333, which are sequentially arranged along the direction of an optical axis 330. The fourth optical lens group 34 comprises plural lenses (not shown), which are sequentially arranged along the direction of an optical axis 340. The fifth optical lens group 35 comprises plural lenses (not shown), which are sequentially arranged along the direction of an optical axis 350. The arrangement sequences of the lenses of the fourth optical lens group 34 and fifth optical lens group 35 may be identical to or different from the arrangement sequences of the first optical lens group 31 and the third optical lens group 33.

In this embodiment, the second optical lens group 32 is a center optical lens group, and the first optical lens group 31, the third optical lens group 33, the fourth optical lens group 34 and the fifth optical lens group 35 are peripheral optical lens groups around the center optical lens group. Moreover, due to the binocular parallax of the human's eyes (e.g. about 6 degrees), the included angle between the optical axis 320 of the second optical lens group 32 (i.e. the center optical axis) and each of the optical axis 310 of the first optical lens group 31 (i.e. the peripheral optical axis), the optical axis 330 of the third optical lens group 33 (i.e. the peripheral optical axis), the optical axis 340 of the fourth optical lens group 34 (i.e. the peripheral optical axis) and the optical axis 350 of the fifth optical lens group 35 (i.e. the peripheral optical axis) is smaller than 20 degrees or adjusted according to the viewer's position. Preferably, this included angle is in the range between 3 and 4 degrees.

Preferably but not exclusively, the first lens 311 of the first optical lens group 31, the second lens 321 of the second optical lens group 32 and the third lens 331 of the third optical lens group 33 are connected with each other, and the corresponding lenses of the third optical lens group 33, the fourth optical lens group 34 and the fifth optical lens group 35 are connected with each other. That is, the first lens 311, the second lens 321 and the third lens 331 are integrally formed as a single transparent structure, and the corresponding lenses of the optical lens groups 33, 34 and 35 are integrally formed as another single transparent structure. Similarly, the fourth lens 312 of the first optical lens group 31, the fifth lens 322 of the second optical lens group 32 and the sixth lens 332 of the third optical lens group 33 are connected with each other, and the corresponding lenses of the third optical lens group 33, the fourth optical lens group 34 and the fifth optical lens group 35 are connected and integrally with each other. Similarly, the seventh lens 313 of the first optical lens group 31, the eighth lens 323 of the second optical lens group 32 and the ninth lens 33 of the third optical lens group 33 are connected with each other, and the corresponding lenses of the third optical lens group 33, the fourth optical lens group 34 and the fifth optical lens group 35 are connected and integrally with each other. By this design, the combined optical lens module 3 can be assembled more easily. Since the combined optical lens module 3 has the advantage of miniaturization, the combined optical lens module 3 can be applied to a handheld mobile device such as a mobile phone, a tablet computer or any other wearable device.

Moreover, the first optical lens group 31, the second optical lens group 32 and the third optical lens group 33 are visible light lens groups for allowing plural visible light beams 81 to go through and changing the propagating directions of the visible light beams 81. Take the fourth lens 312 of the first optical lens group 31 as an example. The fourth lens 312 has a first lens surface 3121 and a second lens surface 3122 opposed to the first lens surface 3121. After the visible light beam 81 is introduced into the fourth lens 312 through the first lens surface 3121, the propagating direction of the visible light beam 81 is changed according to the optical and physical properties of the fourth lens 312 and then outputted from the second lens surface 3122 of the fourth lens 312. Moreover, the number of the lenses of each visible light lens group and the arrangement sequence of the lenses of each visible light lens group may be determined according to the practical requirements and the optical and physical properties of the lenses. Consequently, the visible light beams 81 introduced into the lenses are propagated along specified directions.

Moreover, the fourth optical lens group 34 and the fifth optical lens group 35 are invisible light lens groups for allowing plural invisible light beams (not shown) to go through and changing the propagating directions of the invisible light beams. Moreover, the number of the lenses of each invisible light lens group and the arrangement sequence of the lenses of each invisible light lens group may be determined according to the practical requirements and the optical and physical properties of the lenses. Consequently, the invisible light beams introduced into the lenses are propagated along specified directions. In other words, the numbers and the arrangement sequences of the lenses of the fourth optical lens group 34 and the fifth optical lens group 35 may be identical to or different from those of the first optical lens group 31, the second optical lens group 32 or the third optical lens group 33. An example of the invisible light beam includes but is not limited to an ultraviolet light beam, an infrared light beam, a near infrared light beam or a far infrared light beam.

As mentioned above, the combined optical lens module comprises five optical lens groups, and each optical lens group comprises three lenses (3P). It is noted that numerous modifications and alterations may be made while retaining the teachings of the invention. The number of the optical lens groups and the number of the lenses of each optical lens group may be determined by those skilled in the art according to the practical requirements. Definitely, the arrangement sequence of these optical lens groups, the number of the visible optical lens groups and the number of the invisible optical lens groups may be determined according to the practical requirements.

Figure 7:
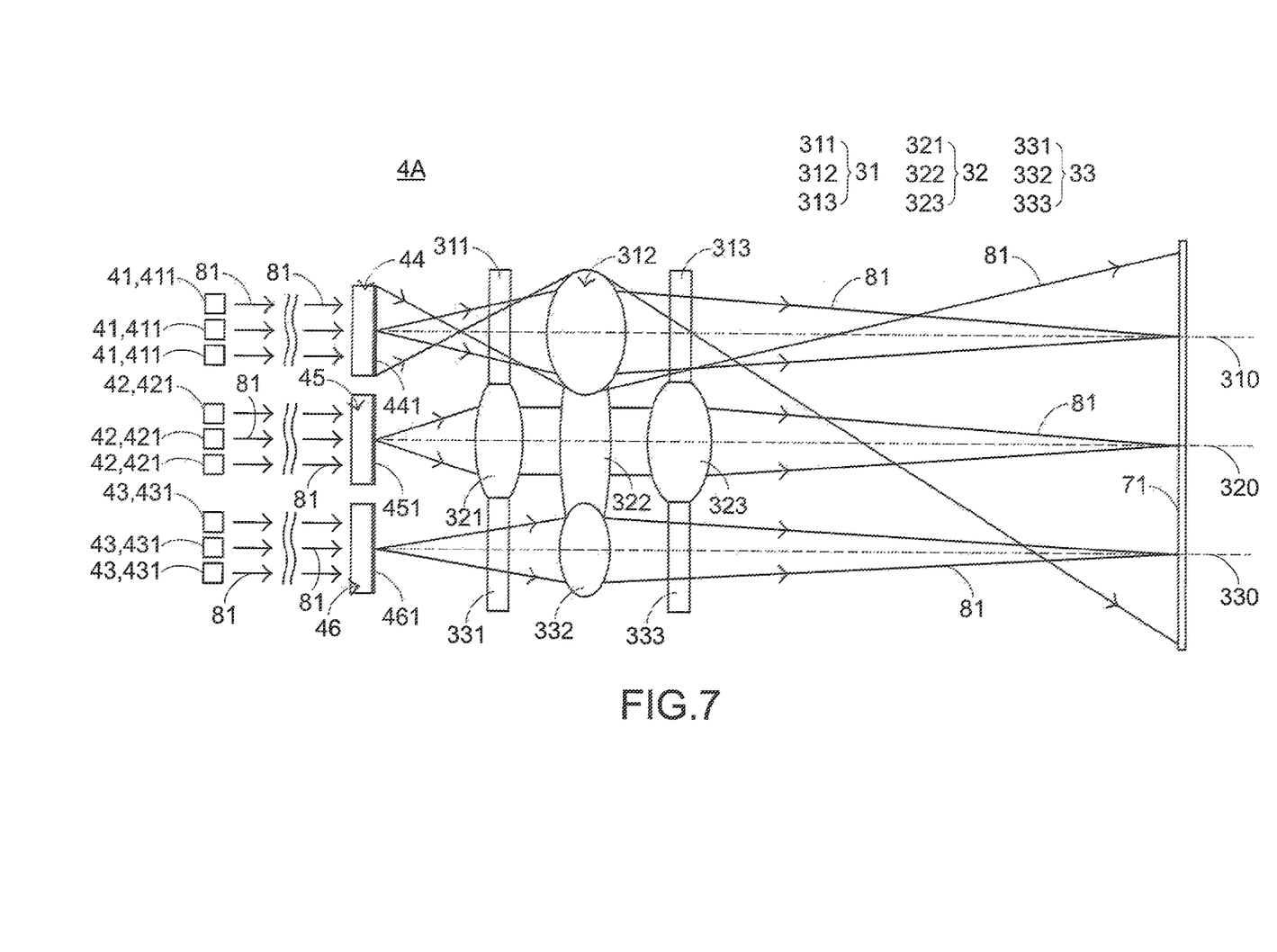
FIG. 7 is a schematic view illustrating a portion of an optical imaging device using the combined optical lens module of FIG. 5 according to a first embodiment of the present invention.
Figure 8:
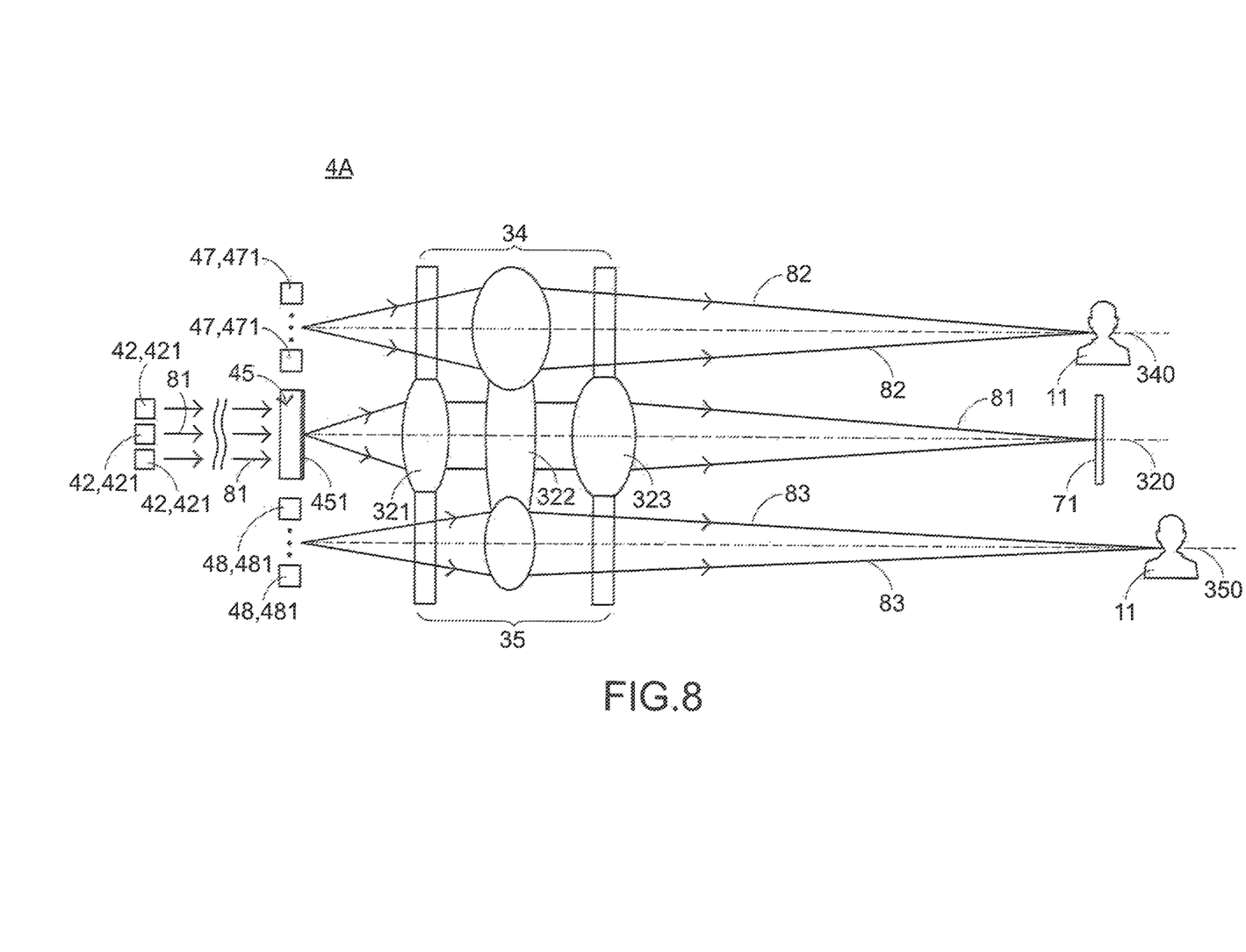
FIG. 8 is a schematic view illustrating another portion of the optical imaging device of FIG. 7.
Figure 9:
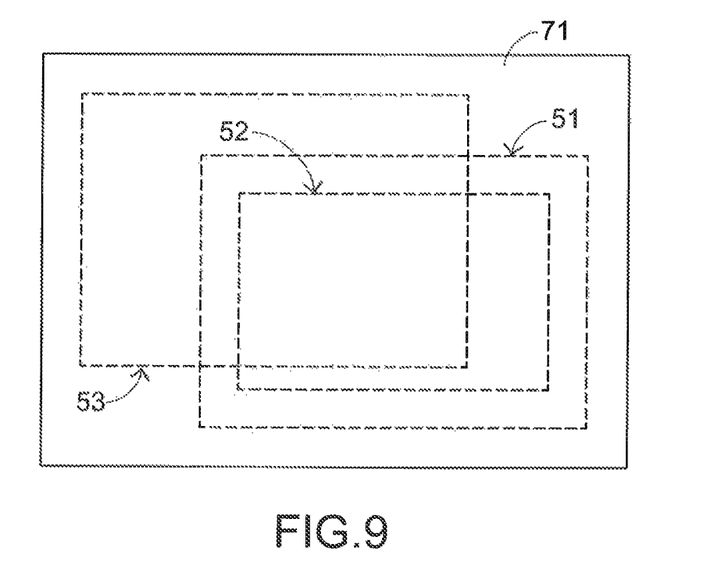
FIG. 9 is a schematic view illustrating a first projection block, a second projection block and a third projection block on a projection surface as shown in FIG. 7.
Figure 10:
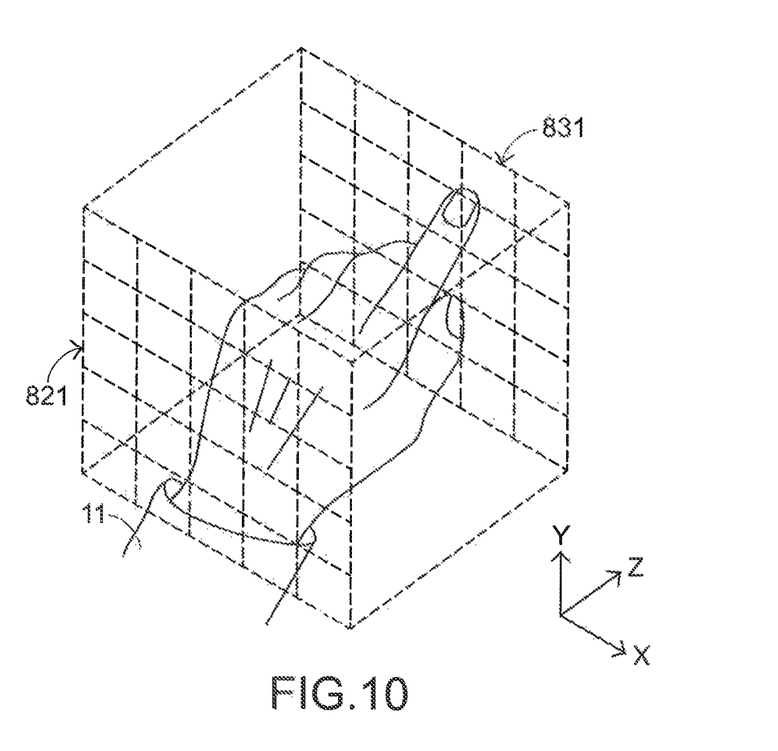
FIG. 10 is a schematic view illustrating the concepts of projecting out a first sensing network and a second sensing network by a first invisible light-emitting unit and a second invisible light-emitting unit as shown in FIG. 8.

Please refer to FIGS. 7, 8 and 9. FIG. 7 is a schematic view illustrating a portion of an optical imaging device using the combined optical lens module of FIG. 5 according to a first embodiment of the present invention. FIG. 8 is a schematic view illustrating another portion of the optical imaging device of FIG. 7. FIG. 9 is a schematic view illustrating a first projection block, a second projection block and a third projection block on a projection surface as shown in FIG. 7. FIG. 10 is a schematic view illustrating the concepts of projecting out a first sensing network and a second sensing network by a first invisible light-emitting unit and a second invisible light-emitting unit as shown in FIG. 8.

In this embodiment, the optical imaging device 4A is an optical projection apparatus. Moreover, the optical imaging device 4A comprises a first visible light-emitting unit 41, a second visible light-emitting unit 42, a third visible light-emitting unit 43, a first display element 44, a second display element 45, a third display element 46, a first invisible light-emitting unit 47, a second invisible light-emitting unit 48, a first optical lens group 31, a second optical lens group 32, a third optical lens group 33, a fourth optical lens group 34 and a fifth optical lens group 35.

Please refer to FIGS. 7 and 9 again. The first visible light-emitting unit 41 comprises plural visible light sources 411. The second visible light-emitting unit 42 comprises plural visible light sources 421. The third visible light-emitting unit 43 comprises plural visible light sources 431. The first visible light-emitting unit 41 may provide plural visible light beams 81 to the first display element 44. Consequently a first image 441 shown on the first display element 44 is illuminated by the plural visible light beams 81. After the plural visible light beams 81 are sequentially transmitted through the first optical lens group 31 and then outputted, the first image 441 is projected on a first projection block 51 of a projection surface 71. The second visible light-emitting unit 42 may provide plural visible light beams 81 to the second display element 45. Consequently, a second image 451 shown on the second display element 45 is illuminated by the plural visible light beams 81. After the plural visible light beams 81 are sequentially transmitted through the second optical lens group 32 and then outputted, the second image 451 is projected on a second projection block 52 of the projection surface 71. Similarly, the third visible light-emitting unit 43 may provide plural visible light beams 81 to the third display element 46. Consequently, a third image 461 shown on the third display element 46 is illuminated by the plural visible light beams 81. After the plural visible light beams 81 are sequentially transmitted through the third optical lens group 33 and then outputted, the third image 461 is projected on a third projection block 53 of the projection surface 71.

The first projection block 51, the second projection block 52 and the third projection block 53 may be completely overlapped with each other or not completely overlapped with each other. In case that the first projection block 51, the second projection block 52 and the third projection block 53 are not completely overlapped with each other, the first projection block 51, the second projection block 52 and the third projection block 53 are coplanar. That is, the first image 441, the second image 451 and the third image 461 are focused on the same projection surface 71 by the first optical lens group 31, the second optical lens group 32 and the third optical lens group 33, respectively. Moreover, at least two of the first projection block 51, the second projection block 52 and the third projection block 53 are partially overlapped with each other, or none of the first projection block 51, the second projection block 52 and the third projection block 53 are overlapped with each other.

Alternatively, at least two of the first projection block 51, the second projection block 52 and the third projection block 53 are non-coplanar. That is, at least two of the first image 441, the second image 451 and the third image 461 are focused on different projection surfaces by the first optical lens group 31, the second optical lens group 32 and the third optical lens group 33, respectively. Moreover, at least two of the first projection block 51, the second projection block 52 and the third projection block 53 are partially overlapped with each other, or none of the first projection block 51, the second projection block 52 and the third projection block 53 are overlapped with each other. The relative angle between any two coplanar projection surfaces may be adjusted according to the position of the user. Moreover, the first projection block 51, the second projection block 52 and the third projection block 53 may be simultaneously projected out or successively projected out according to a predetermined time sequence.

In this embodiment as shown in FIGS. 7 and 9, the first projection block 51, the second projection block 52 and the third projection block 53 are projected on the same coplanar projection surface 71. That is, the visible light beam 81 corresponding to the first image 441 is focused on the projection surface 71 by the lenses of the first optical lens group 31, the visible light beam 81 corresponding to the second image 451 is focused on the projection surface 71 by the lenses of the second optical lens group 32, and the visible light beam 81 corresponding to the third image 461 is focused on the projection surface 71 by the lenses of the third optical lens group 33. Moreover, at least two of the first projection block 51, the second projection block 52 and the third projection block 53 are at least partially overlapped with each other, and at least two of the first image 441, the second image 451 and the third image 461 are simultaneously projected out. By the multi-projection approach, a realistic 3D stereoscopic image can be produced and thus the 3D auto-stereoscopic efficacy can be achieved. Consequently, while watching the image, the viewer may feel that he (or she) is personally on the scene without the need of wearing any 3D equipment (e.g. 3D glasses).

Please refer to FIGS. 8 and 10 again. In this embodiment, the first invisible light-emitting unit 47 comprises plural infrared light sources 471. The plural infrared light sources 471 may emit plural invisible light beams 82 (i.e. the infrared light beams). After the plural invisible light beams 82 are transmitted through the fourth optical lens group 34, the propagating directions of the plural invisible light beams 82 are changed. Consequently, a first sensing network 821 in a planar form is projected out. Moreover, if an infrared sensing module (not shown) cooperatively used, a gesture action or other actions of a human body 11 in the first sensing network 821 may be sensed by the infrared sensing module.

Similarly, the second invisible light-emitting unit 48 comprises plural infrared light sources 481. The plural infrared light sources 481 may emit plural invisible light beams 83 (i.e. the infrared light beams). After the plural invisible light beams 83 are transmitted through the fifth optical lens group 35, the propagating directions of the plural invisible light beams 83 are changed. Consequently, a second sensing network 831 in a planar form is projected out. Moreover, if an infrared sensing module (not shown) cooperatively used, a gesture action or other actions of a human body 11 in the second sensing network 831 may be sensed by the infrared sensing module.

Moreover, the first sensing network 821 and the second sensing network 831 are projected on different projection surfaces at different distances with respect to the projecting apparatus. The first sensing network 821 and the second sensing network 831 are nearly in parallel with each other and apart from each other in a front-and-rear relationship. Consequently, the optical imaging device 4A is capable of sensing the action of the human body in the region between the first sensing network 821 and the second sensing network 831 (i.e. a three-dimensional space defined by the X-axis, the Y-axis and the Z-axis). The technologies and the operating principles of the infrared sensing module are well known to those skilled in the art, and are not redundantly described herein.

Alternatively, in some embodiments, at least one of the first sensing network 821 and the second sensing network 831 is coplanar with the projection surface 71, and at least partially overlapped with at least one of the first projection block 51, the second projection block 52 and the third projection block 53. Consequently, the image projected out by the optical imaging device 4A can be interacted with the user. For example, in case that an image of a keyboard is projected out by the optical imaging device 4A, a corresponding control command is generated by sensing a button pressing action of the user. The types and uses of the first invisible light-emitting unit 47 and the second invisible light-emitting unit 48 are presented herein for purpose of illustration and description only. It is noted that numerous modifications and alterations may be made while retaining the teachings of the invention. For example, in another embodiment, the arrangements of the first invisible light-emitting unit 47 and the fourth optical lens group 34 may be used to detect a specified object.

Figure 11:
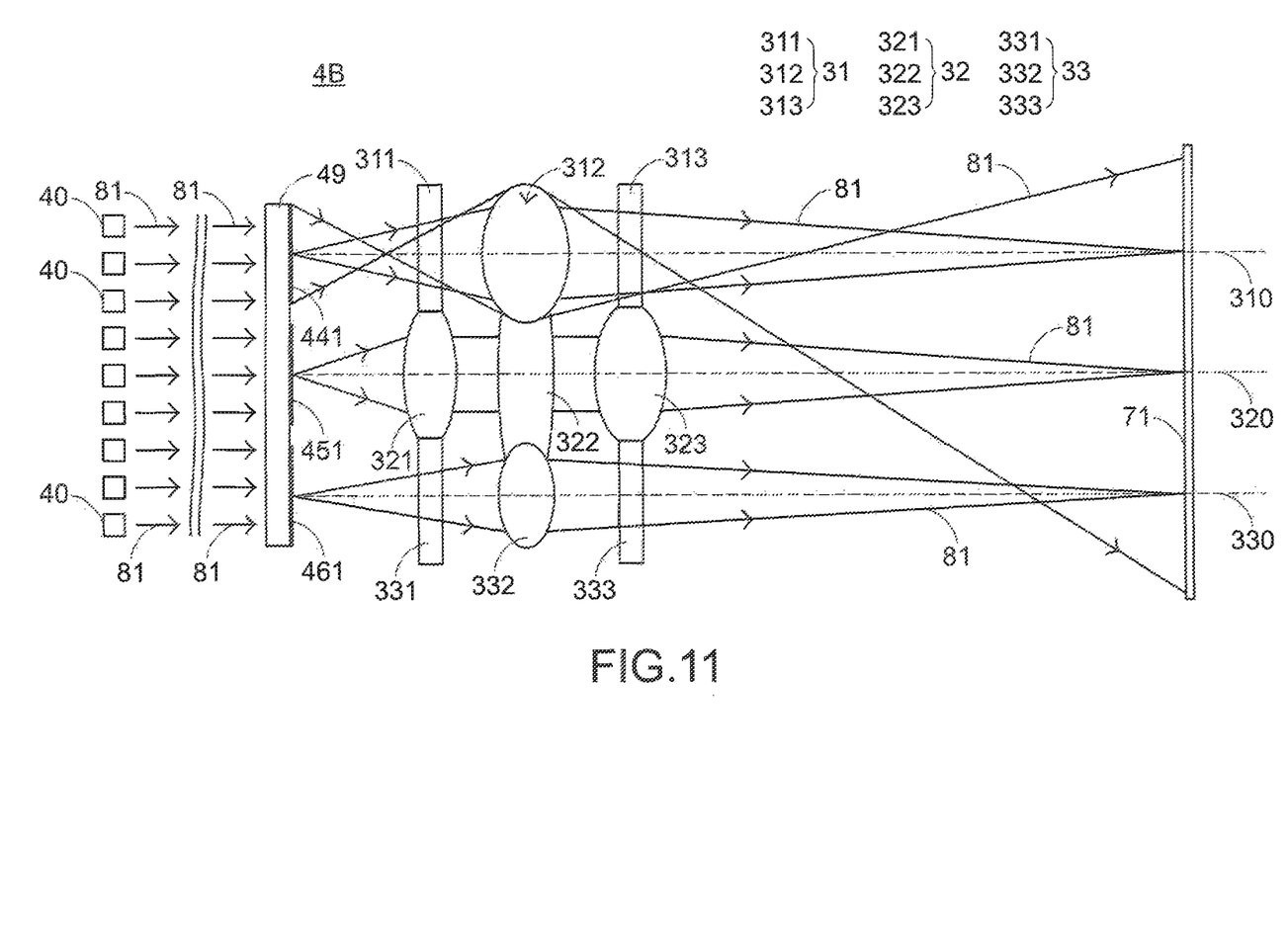
FIG. 11 is a schematic view illustrating a portion of an optical imaging device using the combined optical lens module of FIG. 5 according to a second embodiment of the present invention.

FIG. 11 is a schematic view illustrating a portion of an optical imaging device using the combined optical lens module of FIG. 5 according to a second embodiment of the present invention. Component parts and elements of the optical imaging device 4B corresponding to those of the first embodiment are designated by identical numeral references, and detailed descriptions thereof are omitted. In comparison with the first embodiment, the optical imaging device 4B comprises a single display unit 49 and a single visible light-emitting unit 40. The single visible light-emitting unit 40 may provide plural visible light beams 81 to the single display unit 49. Consequently, a first image 441, a second image 451 and a third image 461 shown on the single display unit 49 are illuminated by the plural visible light beams 81. After the plural visible light beams 81 are sequentially transmitted through the first optical lens group 31 and then outputted, the first image 441 is projected on a first projection block 51. After the plural visible light beams 81 are sequentially transmitted through the second optical lens group 32 and then outputted, the second image 451 is projected on a second projection block 52. After the plural visible light beams 81 are sequentially transmitted through the third optical lens group 33 and then outputted, the third image 461 is projected on a third projection block 53.

Figure 12:
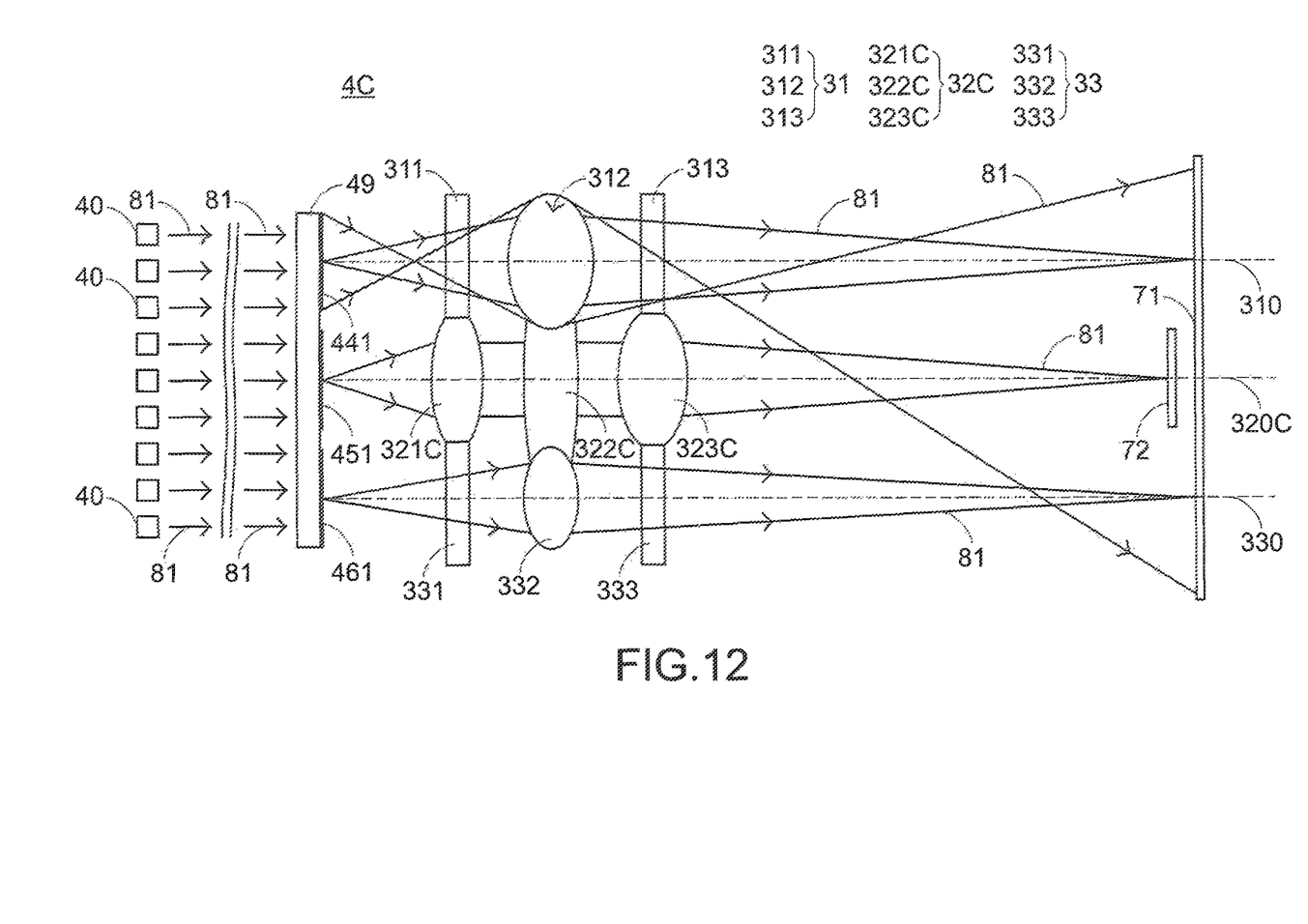
FIG. 12 is a schematic view illustrating a portion of an optical imaging device using the combined optical lens module of FIG. 5 according to a third embodiment of the present invention.

FIG. 12 is a schematic view illustrating a portion of an optical imaging device using the combined optical lens module of FIG. 5 according to a third embodiment of the present invention. Component parts and elements of the optical imaging device 4C corresponding to those of the second embodiment are designated by identical numeral references, and detailed descriptions thereof are omitted. In comparison with the second embodiment, the second projection block 52 is not coplanar with the first projection block 51 and the third projection block 53. That is, the plural visible light beams 81 corresponding to the first image 441 are focused on the projection surface 71 by the first optical lens group 31, and the plural visible light beams 81 corresponding to the third image 461 are focused on the projection surface 71 by the third optical lens group 33. In this embodiment, the plural visible light beams 81 corresponding to the second image 451 are focused on another projection surface 72 by the second optical lens group 32. The projection surface 72 is located in front of the projection surface 71. Consequently, a multilayered imaging effect is achieved.

Figure 13:
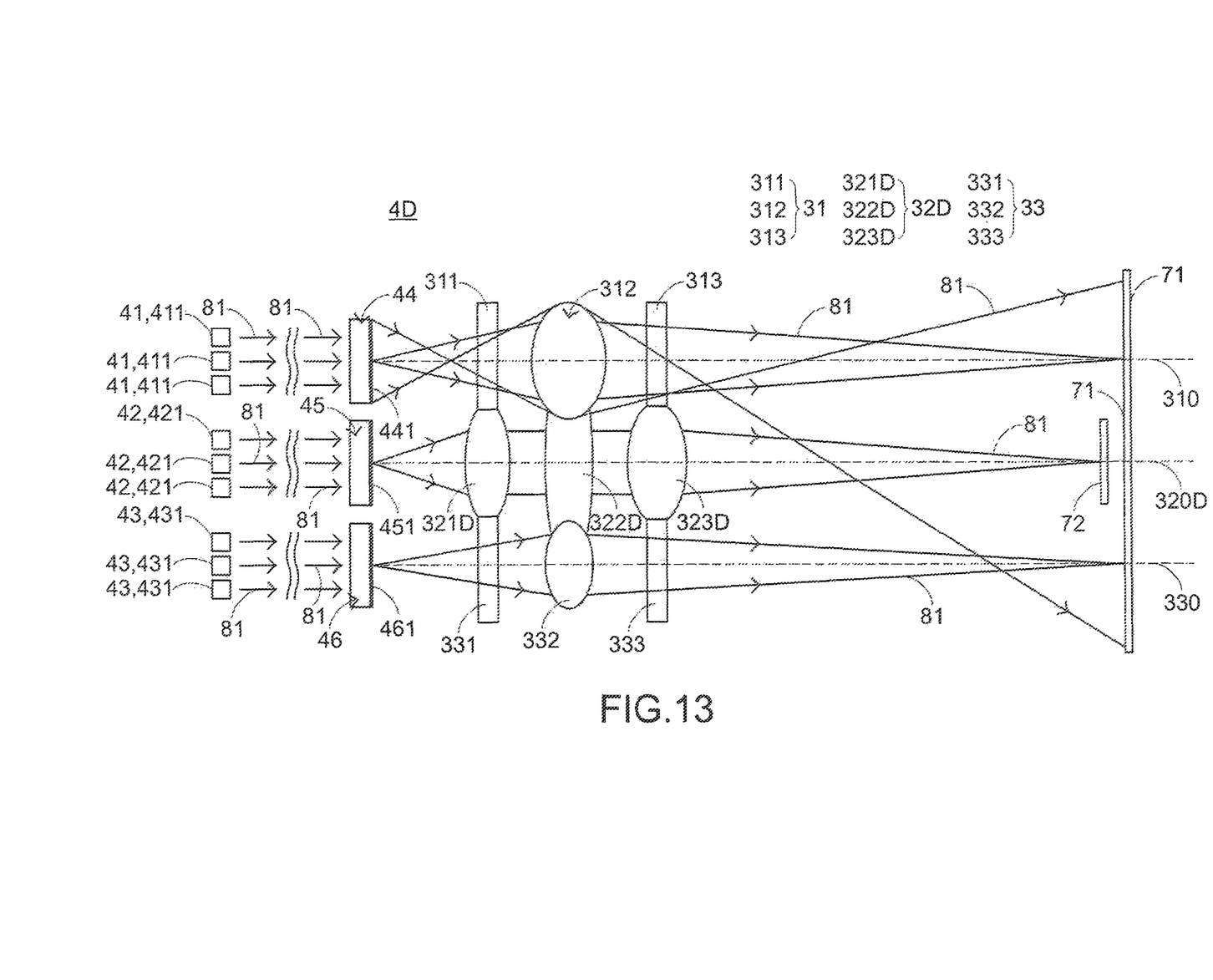
FIG. 13 is a schematic, view illustrating a portion of an optical imaging device using the combined optical lens module of FIG. 5 according to a fourth embodiment of the present invention.

FIG. 13 is a schematic view illustrating a portion of an optical imaging device using the combined optical lens module of FIG. 5 according to a fourth embodiment of the present invention. Component parts and elements of the optical imaging device 4D corresponding to those of the first embodiment are designated by identical numeral references, and detailed descriptions thereof are omitted. In comparison with the first embodiment, the second projection block 52 is not coplanar with the first projection block 51 and the third projection block 53. That is, the plural visible light beams 81 corresponding to the first image 441 are focused on the projection surface 71 by the first optical lens group 31, and the plural visible light beams 81 corresponding to the third image 461 are focused on the projection surface 71 by the third optical lens group 33. In this embodiment, the plural visible light beams 81 corresponding to the second image 451 are focused on another projection surface 72 by the second optical lens group 32. The projection surface 72 is located in front of the projection surface 71. Consequently, a multilayered imaging effect is achieved.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A combined optical lens module, comprising:
   plural optical lens groups comprising at least one visible light lens group and at least one invisible light lens group, wherein after at least one visible light beam is transmitted through the at least one visible light lens group, a propagating direction of the at least one visible light beam is changed, wherein after at least one invisible light beam is transmitted through the at least one invisible light lens group, a propagating direction of the at least one invisible light beam is changed; and
   a housing accommodating the plural optical lens groups, wherein one of the plural optical lens groups is a center optical lens group, and the other optical lens groups of the plural optical lens groups are peripheral optical lens groups around the center optical lens group, and an included angle is formed between a center optical axis of the center optical lens group and a peripheral optical axis of each of the plural peripheral optical lens groups.

2. The combined optical lens module according to claim 1, wherein the center optical lens group is one of the at least one visible light lens group or one of the at least one invisible light lens group.

3. The combined optical lens module according to claim 1, wherein the included angle is determined according to a position of a viewer or the included angle is smaller than 20 degrees.

4. The combined optical lens module according to claim 1, wherein the plural optical lens groups comprise at least two integrally formed and interconnected lenses.

5. The combined optical lens module according to claim 1, wherein an image shown on a display element is illuminated by the at least one visible light beam, and the image is projected out after the at least one visible light beam is transmitted through the at least one visible light lens group; each of the at least one invisible light lens group comprises a lens, and the at least one invisible light beam is introduced into the lens through a first surface of the lens and outputted from a second surface of the lens; the at least one invisible light beam comprises at least one of an ultraviolet light beam, an infrared light beam, a near infrared light beam and a far infrared light beam; or the combined optical lens module is included in a wearable mobile device or a wearable device.

6. An optical imaging device with a combined optical lens module, the optical imaging device comprising:
   at least one visible light-emitting unit providing plural visible light beams;
   at least one invisible light-emitting unit providing plural invisible light beams; and
   plural optical lens groups comprising at least one visible light lens group and at least one invisible light lens group, wherein after at least one portion of the plural visible light beams is transmitted through the at least one visible light lens group, a propagating direction of the at least one portion of the plural visible light beams is changed, wherein after at least one portion of the plural invisible light beams is transmitted through the at least one invisible light lens group, a propagating direction of the at least one portion of the plural invisible light beams is changed,
   wherein the at least one visible light lens group at least comprises a first visible light lens group corresponding to a first image and a second visible light lens group corresponding to a second image, wherein the first image is transmitted through the first visible light lens group and projected on a first projection block, and the second image is transmitted through the second visible light lens group and projected on a second projection block.

7. The optical imaging device according to claim 6, wherein the optical imaging device is an optical projection apparatus, and the optical projection apparatus comprises at least one display element, wherein the first image and the second image are shown on the at least one display element and illuminated by the at least one portion of the plural visible light beams, and the first image and the second image are projected out after the at least one portion of the plural visible light beams is transmitted through the corresponding visible light lens group.

8. The optical imaging device according to claim 7, wherein the at least one display element is a single display element showing the first image and the second image, or the at least one display element comprises a first display element showing the first image and a second display element showing the second image.

9. The optical imaging device according to claim 8, wherein the first projection block and the second projection block are coplanar or non-coplanar; the first projection block and the second projection block are at least partially overlapped or not overlapped; or the first image and the second image are simultaneously projected out or successively projected out.

10. The optical imaging device according to claim 6, wherein one of the plural optical lens groups is a center optical lens group, and the other optical lens groups of the plural optical lens groups are peripheral optical lens groups around the center optical lens group.

11. The optical imaging device according to claim 10, wherein the center optical lens group is one of the at least one visible light lens group or one of the at least one invisible light lens group; or an included angle is formed between a center optical axis of the center optical lens group and a peripheral optical axis of each of the plural peripheral optical lens groups.

12. The optical imaging device according to claim 6, wherein the optical imaging device further comprises a housing accommodating the plural optical lens groups; the at least one invisible light beam comprises at least one of an ultraviolet light beam, an infrared light beam, a near infrared light beam and a far infrared light beam; or the plural optical lens groups comprise at least two integrally formed and interconnected lenses.

\* \* \* \* \*